United States Patent Office 3,526,462
Patented Sept. 1, 1970

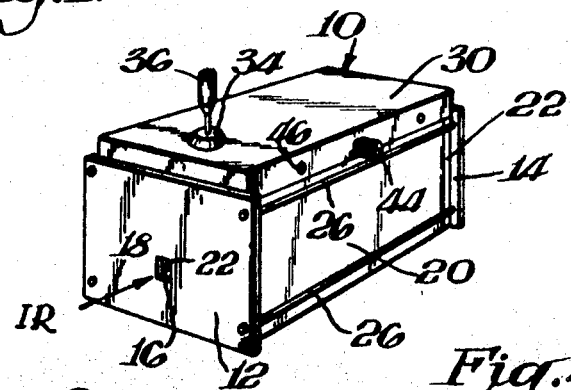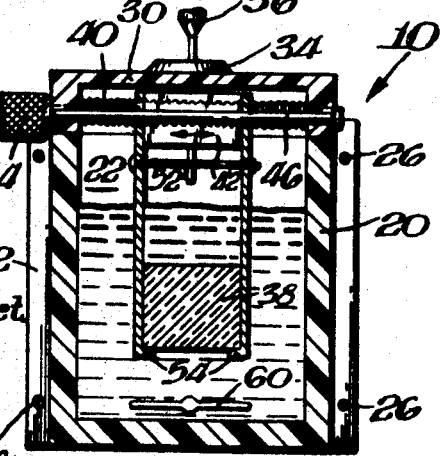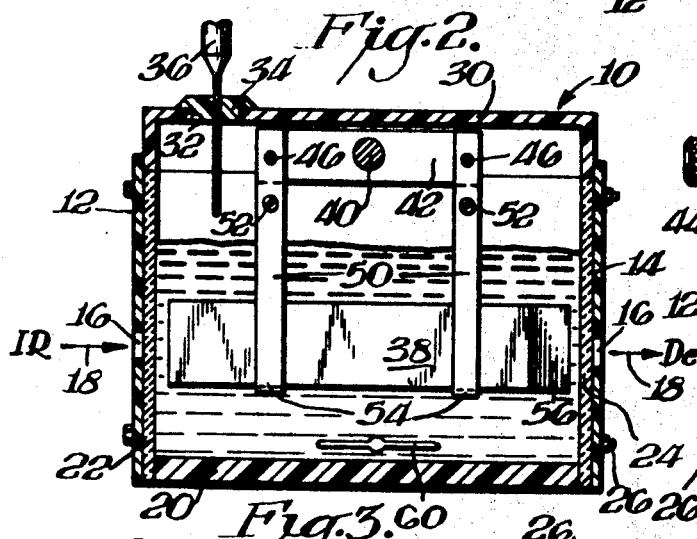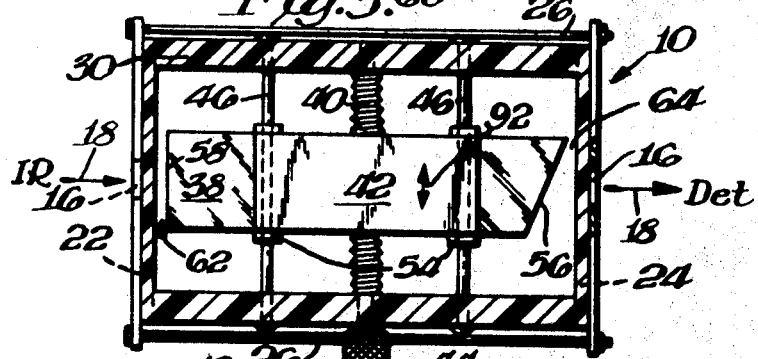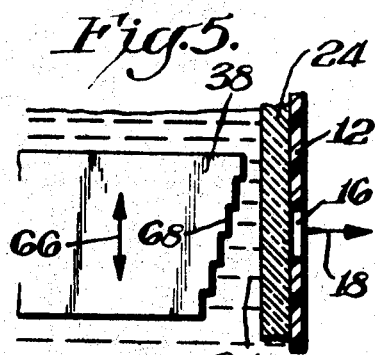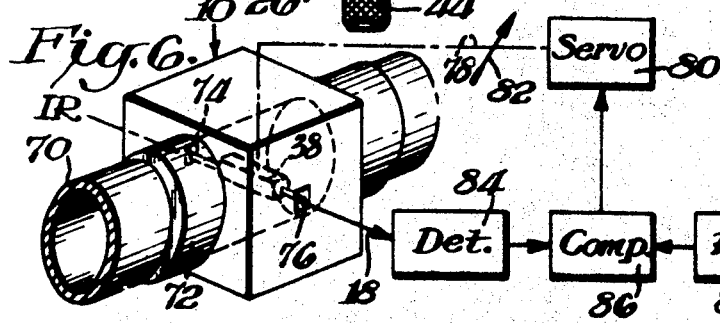

3,526,462
RADIANT ENERGY ABSORPTION CELL WITH A TRANSVERSELY MOVABLE WEDGE-SHAPED SPACER BLOCK THEREIN
Wallace H. McCurdy, Newark, Del., and Ronald P. Upton, Stonington, Conn., assignors to University of Delaware Research Foundation, Inc., Newark, Del., a corporation of Delaware
Filed Aug. 17, 1967, Ser. No. 661,398
Int. Cl. G01n *21/26, 23/12;* H01j *37/00*
U.S. Cl. 356—246
9 Claims

ABSTRACT OF THE DISCLOSURE

A wedge shaped spacer block is disposed within an otherwise conventional infrared absorption cell. The spacer block is formed of a material which is transparent to infrared radiation and has two faces positioned in the path of the infrared light beam. One of these faces is perpendicular to the axis of the light beam. The remaining face is positioned at an angle with respect to the axis of the light beam. By moving the spacer block transversely with respect to the axis of the light beam, the thickness of the sample in said cell through which sample the infrared radiation passes is varied.

---

This invention relates to optical absorption cells and, more particularly, to a radiant energy absorption cell adapted to monitor fluids and/or chemical reactions continuously.

There are a variety of analytical techniques available for monitoring chemical systems. These analytical techniques include ultraviolet, infrared and visible light absorption cells. In all of these techniques a fluid sample is placed in an absorption cell disposed in the path of a beam of radiant energy impinging on a detector. The amount of radiant energy absorbed by the sample fluid is a measure of various characteristics of the fluid. Of the several known optical absorption measuring techniques, all are potentially useful in monitoring fluid systems including chemical reactions automatically and continuously. Cells using visible and ultraviolet spectra for monitoring chemical reactions are commonplace. The ultraviolet or visible spectra is merely passed through the reaction cell and the changes in the light absorbed by the sample undergoing examination are observed. Unfortunately, this rather straight forward technique cannot be used with infrared sources for several reasons. Among these are the fact that infrared sources characteristically have a low intensity. Also, there are relatively small differences between the infrared absorptivity of the sample and the sample solvent.

Infrared absorption is particularly appropriate for use in monitoring reactions where chemical bonds are formed or broken during the reaction. The forming and breaking of such chemical bonds creates significant changes in the absorption of infrared radiation passed through a sample cell.

In the prior art workers desirous of using infrared absorption techniques have selectively withdrawn samples of the reaction at timed intervals during the reaction and measured the infrared light absorbed by each sample. While feasible, there are many disadvantages to withdrawing samples. Among these are the fact that the chamber in which the reaction is occurring must be entered with the attendant explosion hazards. The withdrawal of a sample may disrupt or modify the reaction. Also, the reaction of the sample often must be quenched or retarded in order to make the test. It would be far more desirable to provide a device which would permit the continuous measurement of the infrared absorption by the substances which are undergoing reaction.

To overcome the problem of low source intensity, infrared sample cells have been designed which accommodate samples having relatively small volumes. Such small volume samples absorb little radiation and can be used in conjunction with low intensity light sources. One such cell of this type is described in U.S. Pat. 3,194,111 issued July 13, 1965 to R. A. Saunders. While quite satisfactory for testing small samples, this cell is unsuitable for continuously monitoring chemical reactions for the very reason that the volume held in the cell is too small. Cells that can accommodate reaction mixture volumes typically of 20 milliliters (ml.) or larger are required. It is generally difficult to maintain a homogeneous condition when a reaction occurs in volumes less than 20 milliliters.

Another infrared absorption cell which is capable of providing a variable spacing of the sample under test is described in U.S. Pat. 2,590,695 issued Oct. 5, 1954 to V. J. Coates. Both the Coates and Saunders patents have the same disadvantage—neither permits sufficiently large reaction mixture volumes to be placed into the sample cell for analyses. The reason for this is that cells of these types capable of holding 20 ml. or more of the reaction mixture require that the infrared beam pass through sample thicknesses far exceeding 1 millimeter.

It is, therefore, an object of this invention to overcome many of the disadvantages inherent in the prior art absorption cells.

Another object of this invention is to provide an absorption cell which is capable of continuously monitoring chemical reactions.

Still another object of this invention is to provide a reaction cell for monitoring chemical reactions which cell is simple to use, relatively inexpensive to construct, and has an adjustable sensitivity to infrared radiation. These and other aims appear below.

In accordance with a preferred embodiment of this invention, an absorption cell is constructed which permits the examination of a relatively large volume of a reaction mixture while exposing relatively small portions of the reaction mixture to the source of radiant energy. Such a reaction cell includes windows on opposite sides of the cell to permit the passage of a beam of radiant energy through the cell to a detector. A spacer block of material that is transmissive to the radiant energy is mounted within the cell and positioned in the light path itself. By cutting one end of the spacer block at an angle with respect to the light path, the path length of the radiation through the cell may be adjusted as desired by moving the spacer block transversely with respect to the light path. As the block moves in a path transverse to the light beam the length of block material through which the light must travel increases or decreases depending upon the direction of the move. Thus, due to the angular cut in the block the light beam goes through more or less of the sample being tested. The more block that the beam goes through, the less sample, and conversely.

A relatively large volume of the reaction mixture may be placed in the cell and stirred if desired by suitable stirring means. The actual portion of the reaction mixture through which the beam of radiation passes may be made quite small by forming the spacer block to have a length only slightly less than the distance between the windows on either side of the reaction cell. This enhances the application of the cell to radiation sources having a weak intensity such as infrared sources.

The novel features that are considered characteristic of this invention are set forth with particularity in the appended claims. The invention itself, however, both as to its organization and method of operation as well as additional objects and advantages thereof will best be understood from the following description when read in connection with the accompanying drawings in which:

FIG. 1 is a perspective view of an infrared absorption cell constructed in accordance with one embodiment of this invention;

FIG. 2 is a side elevation view of a section taken longitudinally through the center of the infrared cell of FIG. 1;

FIG. 3 is a sectional top plan view of the absorption cell illustrated in FIG. 1;

FIG. 4 is a sectional end view of the absorption cell illustrated in FIG. 1;

FIG. 5 is a fragmentary view of an alternative embodiment of the spacer block employed in the cell of FIG. 1; and FIG. 6 shown partly in perspective and partly in block diagram illustrates a system employing the variable spacer block of this invention in a continuous flow system.

There is seen in FIGS. 1 through 4 a reaction chamber 10 constructed in accordance with a preferred embodiment of this invention. The reaction chamber 10 includes a pair of end faces 12 and 14, respectively. Each of the end faces 12 and 14, respectively, includes a cut away aperture or window portion 16 which permits the passage of light or other radiant energy such as infrared radiation denoted by the letters IR directly through the reaction chamber or cell to a suitable detector denoted DET. which is seen most clearly in FIGS. 2, 3, and 6. The passage of the radiant energy through the cell is denoted by the arrows 18.

The cell itself is constructed from a U-shaped block or member 20 (FIG. 3) with the portions of the U forming respectively the bottom and two sides of the cell. The block 20 may be of any suitable material that is generally non-reactive to the chemicals under test. One such material which has been found satisfactory is polyethylene. On either end of the U-shaped plastic block 20 are placed windows or sheets of material which are transparent or present a low optical density to the radiant energy. These sheets, designated by the numerals 22 and 24, respectively, abut the end faces of the U-shaped members 20. A suitable sealing grease may be placed on the end faces of the U-shaped member so as to afford a fluid tight seal and render the cell leak proof. Suitable greases of this type are fluorocarbon greases and silicon greases. These window plates 22 and 24, respectively, are held tightly against the end faces of the U-shaped block 20 by the end plates 12 and 14, respectively. Pressure is applied to the window plates 22 and 24 by bolts 26 which pass through the end plates 12 and 14, respectively.

The reaction cell has a top or cover 30 which may be also molded of a polyethylene or other material which is not chemically reactive with the mixtures under test and rests on the top edges of both the U-shaped block 20 side walls and the window plates 22 and 24, respectively. If desired a sealing grease of the type described may be used to provide a seal between the abutting surfaces of the cover 30 and the bottom portion of the reaction cell 10. An aperture 32 within the cover 30 permits a rubber septum 34 to pass a syringe needle 36 (shown only partially). Other suitable means of introducing fluid into the reaction cell may also be used.

In addition to providing a closure for the reaction cell, the primary function of the cover 30 is to support a spacer block 38. A micrometer carriage assembly supports and positions this variable spacer block 38. The micrometer carriage assembly includes a micrometer screw 40 which threadedly engages a mounting block 42. The micrometer screw 40 is rotatably positioned at each end by the downwardly extending side portions of the cover 30.

A pair of guide rods 46 extend through holes in the downwardly extending side portions of the cover 30. These guide rods 46 permit the mounting block 42 to slide horizontally as the micrometer screw 40 is turned. These prevent the mounting block 42 from swinging about the micrometer screw 40 when it is turned as by a knurled knob 44. Bearings may be employed if desired, however, they have been generally found to be necessary. In each corner of the mounting block 42 there is secured as by cementing or by screws (not shown) four downwardly extending legs (FIG. 2) 50 which provide holding arms or fingers for carrying the variable spacer block 38 as in a sling. These fingers or legs 50 are held tightly against either side of the variable spacer block 38 by bolts 52 which when tightened provide sufficient pressure against the side of the block 38 to permit a secure tight mounting for the block. If desired, inwardly extending projections 54 (FIG. 4) may be provided on the bottom end of each leg 50 so as to more securely grip the spacer block and prevent it from falling down into the solution although such are generally unnecessary.

This particular means of mounting the spacer block 38 in the path of beam 18 is merely illustrative. Other suitable mounting means, such as that described in U.S. Pat. 2,637,817 issued May 5, 1953 to A. D. Herbert may be employed if desired in mounting the novel spacer block 38 of this invention. All that is required is a mechanism capable of holding the spacer block 38 and adjusting it transversely with respect to the axis of beam of radiant energy 18 within the reaction cell. A magnetic stirrer, illustrated diagrammatically by the propeller 60, may be positioned in the bottom of the reaction cell 10 to permit the cell contents to be stirred while the reaction is in progress. Indexing tabs (not shown) may be mounted on the end plates 12 and 14 to insure that the top 30 is fixedly secured against side movements and is returnable to the same position relative to the beam of light 18.

The spacer block 38 is seen to be wedge-shaped and to have a pair of major or opposite faces 56 and 58 disposed in the beam of radiant energy 18. As may be observed from FIGS. 3 and 4, one of the faces 56, the face from which energy emerges, is positioned at an angle other than 90° with respect to the axis of the beam 18 whereas the remaining face 58 which is incident to the radiant energy is positioned perpendicularly to the axis of the beam 18. The variable spacer block 38 may be formed of any material which is transparent or at least presents a relatively low optical density to the particular radiant energy being used. In the case of low intensity infrared radiation, where this cell is particularly useful, materials such as sodium chloride, silver chloride, calcium fluoride, lithium fluoride, silicon or germanium may be employed. The end faces 56 and 58 of the spacer block 38 do not require optical polishing for many applications. The end face 58 incident to the radiant energy preferably is perpendicular to the axis of the beam 18 as stated although this is not entirely necessary. If the incident end face 58 is other than perpendicular, there is some loss of radiant energy due to diffractor and subsequent scattering. There is some loss due to diffraction at the emergent end face due to its angular position, but this is small because of the proximity of the exit window. Thus the spacer block 38 may be reversed in position to that shown with some attendant loss of radiant energy. Likewise both end faces may be at an angle with respect to the light beam, again with some loss of radiant energy. Both embodiments, however, are within the purview of this invention.

In operation a sample mixture is introduced into the cell through the syringe needle 36. A sufficient quantity of the mixture is introduced to completely cover the variable spacer block 38 as may be seen most clearly in FIG. 2. If it is desired to study the changes in absorption of radiant energy during the progress of a reaction, portions of the reactant are introduced through the syringe needle 36 and if necessary the magnetic stirrer 60 energized. The infrared or other radiation is passed through the transparent windows 22 and 24 at either end of the block and through the length of the variable spacer block 38. By adjustment of the knurled knob 44 of the micrometer screw 40 the block 38 may be moved transversely of the axis of radiant energy 18 so as to provide a longer or shorter path length through the sample mixture. The radiant energy passes through the transparent material of the spacer block 38 and through small portions of the reaction mixture which exists at either end of the spacer block 38. These portions include the space 62 between the lefthand window 22 and the lefthand end (in the drawing) of the spacer block and the space 64 which exists between the righthand end of the spacer block 38 and the righthand window 24.

The length of the right gap 64 is varied by transversely positioning the spacer block 38 in the axis of radiant energy 18. In other words, a variable length light path through the reaction mixture is obtained merely by moving the spacer block back and forth within the reaction cell 10 as seen most clearly in FIG. 3 (arrow 92). As used herein, the word transverse is intended to include movement of the spacer block 38 in all directions except vertically (in FIG. 2). Movement in the vertical direction, i.e., simultaneously perpendicular to the beam axis 18 and in the plane of the angled end face 56, produce no variation in the path length of the radiant energy passing through the sample. Typical total path lengths useful in infrared analysis may vary between 1 and 10 millimeters. The precision of the micrometer screw 40 preferably should be such that these gaps 62 and 64 may be cumulatively adjusted within a tolerance of ±0.01 millimeter (mm.).

As the reaction progresses, it may be necessary to reposition the micrometer screw 40 so as to increase or decrease the path length of the radiant energy. This is done by varying the gap 64. These sample gaps are seen to constitute a thin film of absorbing material between the cell windows and each end of the spacer block 38.

The cell itself is simple to use, inexpensive to construct and generally more sensitive to the progress of chemical reactions than most other infrared cells that are available at the present time. This cell can be readily adjusted to accommodate wide ranges of absorption variations. The cell is particularly suitable for holding a relatively large volume of the reaction mixture and yet it passes the radiant energy through that relatively small portion of the mixture necessary for infrared absorption analysis. Desirably the micrometer screw may be calibrated to facilitate correlation between the spacing of the right gap 64 and the position of the block 38.

In an alternative embodiment of this invention, illustrated in FIG. 5, the angled planar face 56 of the spacer block 38 may be replaced by cutting notches or steps 68 into this end of the sample block as seen in FIG. 4. Thus by positioning the block 38 transversely with respect to the axis of radiation 18 as denoted by the arrow 66, one may provide different discrete path lengths of the sample within the gap 64. Such discrete steps 68 facilitate the digital readout of information since the output signal has discrete levels.

In still another embodiment of the invention, the variable path reaction cell may be incorporated into an actual flowing system illustrated in FIG. 6 and operated by a servo drive in order to monitor the flow of fluids through a pipe 70. The pipe 70 is coupled through a suitable fitting 72 to the reaction cell 10 which may be substantially identical in construction to that illustrated in FIGS. 1 through 4. The only difference would be that the body portion of the block would be formed preferably from a complete block of plastic material having windows 74 and 76 for the passage of infrared radiation transversely to the flow of fluids. Radiation from an infrared source designated IR is passed through windows 74 and 76 and through a variable spacer block 38 which is positioned in this case by a suitable mechanical linkage designated by the dash-dot line 78 from a servo system 80. An indicator denoted by the arrow 82 shows the position of the servo system at any given point in time and, for example may be the pen of a conventional industrial type recorder.

The light from the IR source, passing through the reaction cell 10 including the variable spacer block 38, is detected by a detector 84 to provide an electrical output signal. This electrical output signal is amplified as necessary and passed to a comparator 86 in which the electrical signal from the detector 84 is compared with a reference signal derived from reference source 88. The reference source 88 may be a standard electrical signal of constant adjustable amplitude or may be derived from a reference infrared absorption cell filled with a reference fluid of known concentration. The servo system is a conventional null seeking system and operates in a conventional manner such that whenever the varying amplitude output signal from the detector 84 deviates from the reference level provided by the reference 88, the servo system 80 operates through the linkage 78 to move the variable spacer block 38 back or forth within the axis of beam 18 from the IR source until the light reaching the detector is either increased or decreased and the detector output signal again equals the reference signal. In this manner the position or displacement of the linkage 78 is a measure of the optical density of the fluid flowing through the pipe 70. If, for example, the density of the fluid flowing through pipe 70 increases, the light passing through the spacer block 38 to the detector 84 decreases. The comparator 86 senses this change and provides an error signal to the servo 80 which acts through the linkage 78 to reposition the spacer block 38, to reduce the light path and to permit more light to flow through the fluids in the pipe 70 to the detector 84. The displacement of the mechanical linkage 78 denotes the change in density of the fluid. Alternatively, the spacer block 38 in the flow stream pipe 70 may be held in fixed position (although adjustable as desired) and the servo system attached to a similar spacer block 38 placed in the reference solution of known concentration.

The reaction cell of this invention including the variable spacer block therein, may be used in a variety of other applications in which it is desired to make absorption measurements particularly those using infrared radiation. The use of the variable spacer block, constructed in accordance with this invention, is relatively simple to use and easy to construct. When used in conjunction with a reaction cell, the variable spacer block permits relatively large volumes of sample to be reacted and yet only a relatively small portion of the sample is used in testing. It is this capability that facilitates its use in flowing systems where absorption measurements may be made of relatively large fluid flow rates using relatively small continuous samples. Applications of the cell include the observation of intermediates and reaction kinetics as well as many other usages.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

What is claimed is:

1. Apparatus for measuring the absorption of radiant energy by a fluid comprising:
   a chamber for said fluid,
   said chamber including means for passing a beam of radiant energy having an axis through at least a sample portion of said fluid,
   detector means positioned at a point along the axis of said beam for detecting said radiant energy after passage through said sample portion,
   a wedge-shaped spacer block formed of material presenting a low optical density to said radiant energy positioned in said chamber along the axis of said beam such that the major faces of the wedge transversely intersect said beam axis, thereby to produce substantially an optical void space in said sample portion, and means to displace said spacer block transversely with respect to the axis of said beam of radiant energy, thereby to vary the path length of said beam passing through said sample portion.

2. Apparatus for measuring the absorption of radiant energy according to claim 1 wherein the major faces of said spacer block are planar.

3. Apparatus according to claim 2 wherein one of said faces is perpendicular to the axis of said beam of radiant energy.

4. Apparatus according to claim 3 wherein said chamber also includes means to agitate said sample.

5. Apparatus according to claim 3 wherein said detector means provides an output signal having a magnitude proportional to the intensity of radiant energy passing through said sample portion, and said apparatus also includes:

servo means responsive to the magnitude of said output signal for transversely positioning said spacer block with respect to the axis of said beam of radiant energy, a source of a reference signal, and a null balance system included in said servo means responsive to the difference in magnitudes of said reference and output signals, thereby to reduce said difference to zero, whereby the displacement of said spacer block is a measure of the optical density of said sample.

6. Apparatus according to claim 1 wherein said chamber includes oppositely disposed apertures of material presenting a low optical density to said beam of radiant energy, said apertures each being disposed transversely to said beam of radiant energy, said spacer block having a length along said beam of radiant energy slightly less than the distance between said apertures, thereby to provide a thin film of sample between each of the apertures and respective ones of the first and second faces of said spacer block.

7. Apparatus according to claim 1 wherein the major faces of said spacer block include a first smooth, planar face positioned transversely to and on the axis of said beam of radiant energy and second and third smooth, planar faces each disposed oppositely of said first face and positioned transversely to and on the axis of said beam of radiant energy, the lineal distance as measured along the axis of said beam between said first face and said second and third faces being different.

8. Apparatus according to claim 7 wherein each of said faces is substantially perpendicular to the axis of said beam of radiant energy.

9. Apparatus according to claim 1 wherein the volume of sample exposed to said beam of radiant energy is small compared to the volume of sample in said chamber.

References Cited

UNITED STATES PATENTS

| | | | |
|---|---|---|---|
| 2,637,817 | 5/1953 | Herbert | 250—43.5 |
| 2,697,789 | 12/1954 | Skarstrom | 250—43.5 |
| 2,912,895 | 11/1959 | Hamilton | 88—14 |
| 3,022,422 | 2/1962 | Grove-White | 250—43.5 |

WILLIAM F. LINDQUIST, Primary Examiner

U.S. Cl. X.R.

250—43.5